United States Patent
Wenger

(10) Patent No.: US 8,246,240 B2
(45) Date of Patent: Aug. 21, 2012

(54) SINGLE SCREW EXTRUDER FOR PROCESSING OF LOW VISCOSITY PRECONDITIONED MATERIALS

(75) Inventor: LaVon Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 1020 days.

(21) Appl. No.: 11/969,173

(22) Filed: Jan. 3, 2008

(65) Prior Publication Data
US 2009/0175119 A1 Jul. 9, 2009

(51) Int. Cl.
- B01F 15/02 (2006.01)
- B01F 7/08 (2006.01)
- B01F 7/24 (2006.01)
- A21C 1/06 (2006.01)

(52) U.S. Cl. ........... 366/156.1; 366/20; 366/35; 366/38; 366/79; 366/80; 366/81; 366/82; 366/83; 366/84; 366/85; 366/86; 366/87; 366/88; 366/89; 366/90; 366/50; 366/133; 366/318

(58) Field of Classification Search .......... 366/20, 366/35, 38, 79–90, 50, 133, 156.1, 318
See application file for complete search history.

(56) References Cited

U.S. PATENT DOCUMENTS

| | | | |
|---|---|---|---|
| 3,946,998 A * | 3/1976 | Menges et al. | 366/88 |
| 4,752,139 A | 6/1988 | Hauck | |
| 5,486,328 A | 1/1996 | Luker | |
| 5,694,833 A * | 12/1997 | Wenger | 99/348 |
| 6,386,748 B1 | 5/2002 | Huber | |
| 6,609,819 B2 * | 8/2003 | Hauck et al. | 366/85 |
| 7,097,873 B2 * | 8/2006 | Asensio et al. | 426/580 |
| 7,674,492 B2 | 3/2010 | Wenger et al. | |
| 2007/0237850 A1 | 10/2007 | Wiltz et al. | |
| 2009/0040863 A1 * | 2/2009 | Blach | 366/85 |

FOREIGN PATENT DOCUMENTS

| | | |
|---|---|---|
| JP | 03158220 | 7/1991 |
| WO | WO9533608 | 12/1995 |

OTHER PUBLICATIONS

Written Opinion and Search report dated Aug. 24, 2009 in corresponding PCT Application No. PCT/US2008/088324, filed on Dec. 24, 2008.

* cited by examiner

*Primary Examiner* — Nathan Bowers
(74) *Attorney, Agent, or Firm* — Hovey Williams LLP

(57) ABSTRACT

Improved single screw extruders systems (40) are provided including a single screw extruder (42, 92) as well as an upstream preconditioner (44). The extruders (42, 92) include a single, internal, elongated, helically flighted, axially rotatable screw assembly (52) having one or more improved screw sections (74, 74a, 76). The screw sections (74, 74a, 76) include specially configured flighting (86) wherein adjacent flighting portions (86a, 86b) have smoothly arcuate surfaces (88) extending between the respective flighting portion peripheries (90a, 90b). This flighting design provides smooth, substantially surge-free operation while increasing SME and cook values. The preferred preconditioner (44) has independently controlled mixing shafts (106, 108) allowing the shafts (106, 108) to be rotated at different rotational speeds and/or directions.

27 Claims, 6 Drawing Sheets

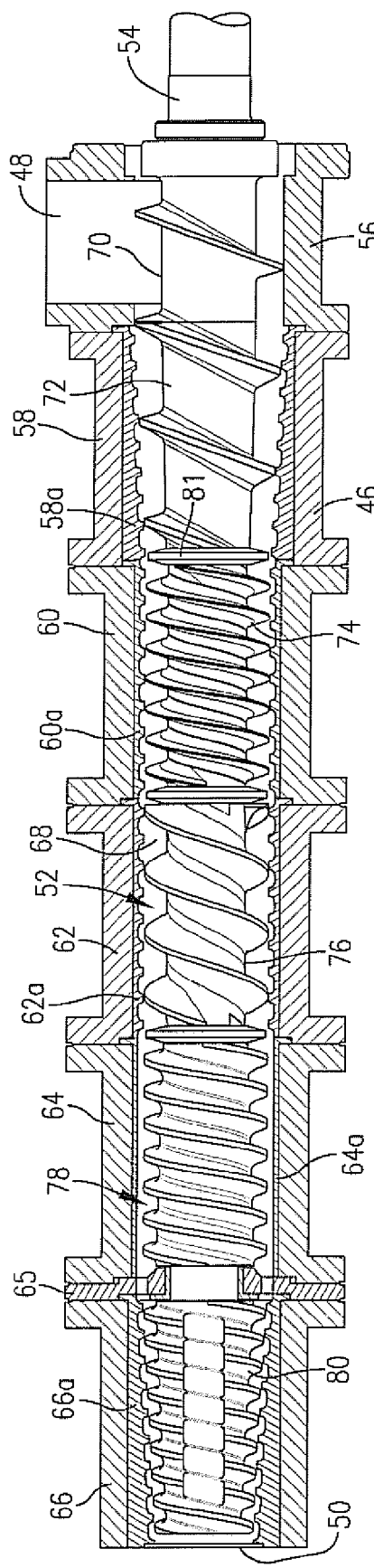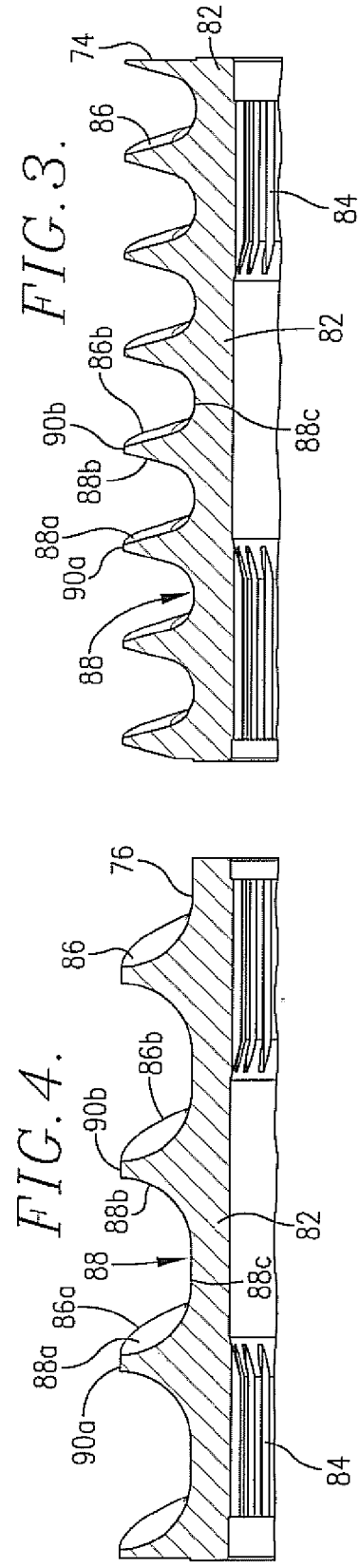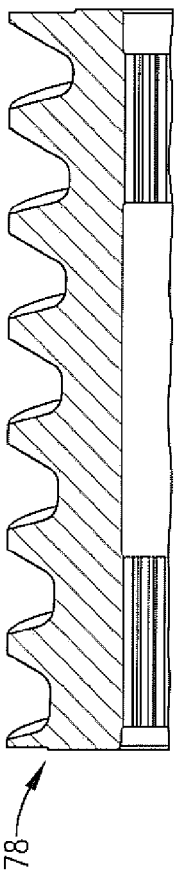

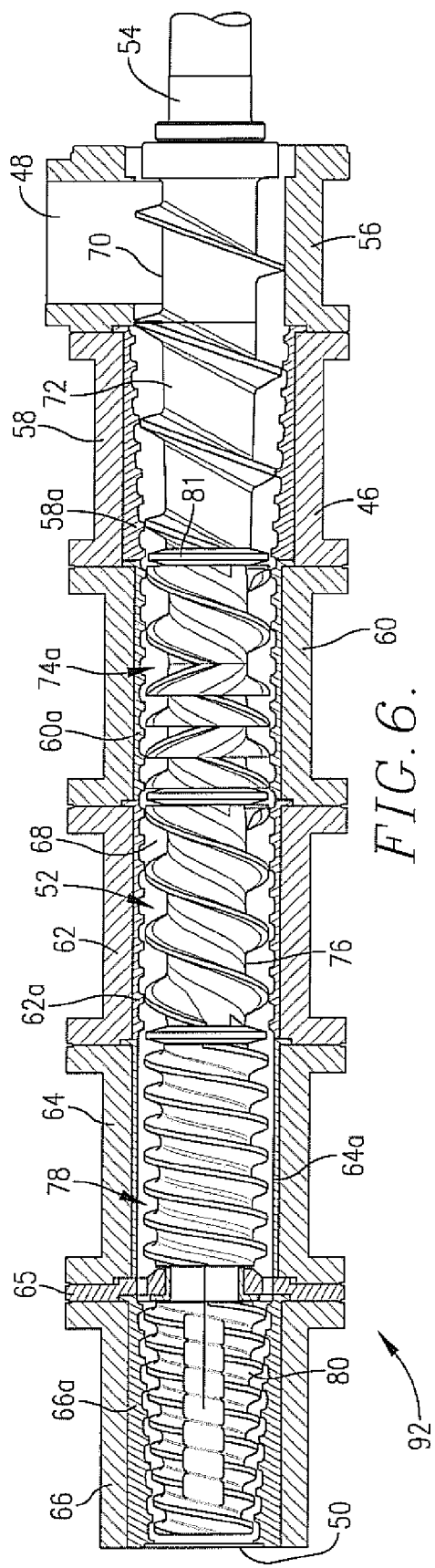
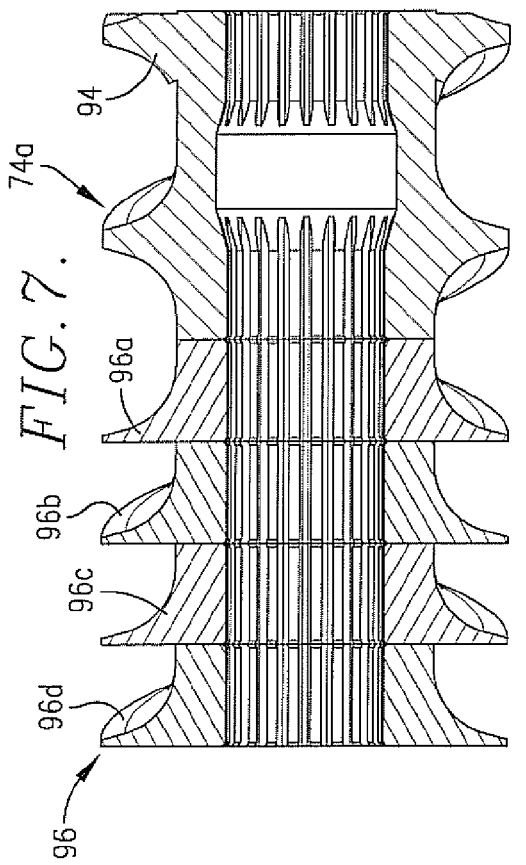
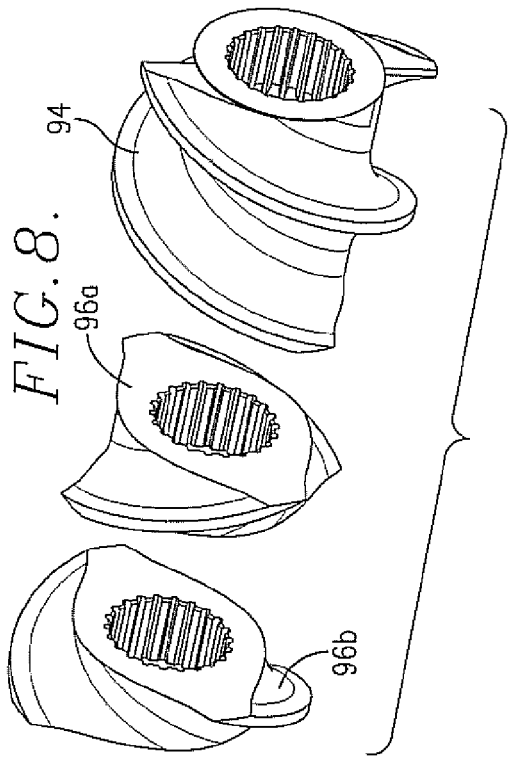
FIG. 6.
FIG. 7.
FIG. 8.

SINGLE SCREW EXTRUDER FOR PROCESSING OF LOW VISCOSITY PRECONDITIONED MATERIALS

BACKGROUND OF THE INVENTION

1. Field of the Invention

The present invention is broadly concerned improved single screw extruders including therein improved screw sections which give positive conveyance even with highly preconditioned, low viscosity materials, as well as enhanced specific mechanical energy (SME) values. The improved screw sections of the invention include substantially smooth and arcuate surfaces between adjacent flighting portions, with the absence of any substantial angular discontinuities or "corners." The performance of the single screw extruders can be enhanced with the use of new dual-shaft preconditioners having independent drives for the shafts and the ability to independently control the rotational speed and/or direction of the preconditioner shafts.

2. Description of the Prior Art

Extrusion systems are commonly used in the production of human foods and animal feeds. Broadly speaking, there are two types of extrusion systems, namely single screw and twin screw systems. As the names imply, single screw extruders include an elongated barrel with only a single, elongated, helically flighted, axially rotatable screw assembly therein. In contrast, twin screw extruders have specially configured barrels with a pair of juxtaposed, helically flighted, axially rotatable and intercalated screw assemblies. It is also quite common to employ a preconditioning device upstream of a single or twin screw extruder, which serves to at least partially cook the starting materials and gelatinized the starch-bearing components thereof. Normally, higher levels of cook and gelatinization are desired inasmuch as this lessens cooking requirements in the downstream extruder, leading to higher quality products and increased throughputs.

Single screw extruders are substantially less complex and expensive, as compared with twin screw extruders. Accordingly, producers of commodity products such as certain types of pet and aquatic feeds tend to prefer a single screw extruder systems. A persistent problem with single screw systems is the fact that highly gelatinized incoming feed materials tend to run unevenly with frequent surges, due to the sticky nature and low viscosities of the feed material. The viscosities of highly gelatinized feeds are relatively low, causing the feeds to build up at the base of the screw assembly with decreased forward conveyance through the extruder barrel. Such effects are exaggerated with incoming feeds containing meats, fish meals, and other high-fat ingredients, or high starch content pet foods. One answer to this problem is to reduce the extent of gelatinization achieved in the upstream preconditioner; but this leads to lower quality final products and lessens system throughputs.

Conventional single screw extruder screw sections are illustrated in FIGS. 9 and 10. Referring first to FIG. 9, the screw section 20 includes a central, tubular screw body 22 as well as outwardly extending, helical flighting 24. The section 20 presents a longitudinal axis A, as well as a root diameter RD. The outwardly extending flighting 24 presents an outer periphery P, thus establishing a flight depth FD between the root diameter of the body 22 and periphery P. In addition, the flighting 24 and body 22 cooperatively define surfaces 26 between adjacent portions of the flighting 24. The surfaces 26 include substantially planar surface portions 28 and 30 extending downwardly from the periphery P to the body 22, as well as a substantially planar intermediate portion 32 interconnecting the portions 28 and 30. It will be observed that the intersections between the planar surfaces 28, 30, and 32 present a relatively sharp angular discontinuities 34 and 36, as well as first and second angles α and β. In this case, the angles α and β are different, namely angle α is 30° relative to vertical, and angle β is 15° relative to vertical.

FIG. 10 illustrates another type of conventional single screw extruder screw element 38 which is similar to section 20, and like reference numerals and characters have been used. The principal difference between the sections 20 and 38 is that in the latter case the angles α and β are the same, namely 15° relative to vertical.

As can be seen from the configuration of these prior art single screw extruder screw elements, the provision of relatively deep flighting with the noted planar surfaces between flighting portions and the discontinuities or "corners" in such surfaces tends to create pockets or dead zones for material. As such, the materials tend to build up at the regions between the flighting portions until a completely full condition is reached, whereupon the extruder tends to "blow" or surge. This instability is a significant problem, and creates unsatisfactory final products.

There is accordingly a need in the art for improved single screw extruder screw sections and assemblies which are capable of handling highly preconditioned, relatively low viscosity incoming products without surging and with positive, even conveyance of the materials through the extruder barrel.

SUMMARY OF THE INVENTION

The present invention overcomes the problems outlined above and provides improved single screw extruders including an elongated barrel having an inlet and a spaced, restricted orifice die outlet. The extruder also includes a single, elongated, axially rotatable, flighted screw assembly presenting a longitudinal axis and situated within the barrel and operable to move material from the inlet through the barrel and out the die outlet. The screw assembly includes at least one elongated screw section having a central body defining a root diameter, and helical flighting extending outwardly from the central body and presenting an outer periphery with spacings between adjacent portions of the flighting. These spacings are each defined by a surface extending from a first outer periphery of one of the flighting portions to a second outer periphery of the adjacent flighting portion; each spacing-defining surface includes first and second surface segments respectively extending inwardly from the first and second peripheries and toward the central body, and a third surface segment interconnecting the first and second surface segments. The first and second surface segments and the proximal first and second flighting peripheries define respective angles of from about 75-90° relative to the longitudinal axis, and the joinder of the first and second surface segments is substantially smooth and arcuate without any substantial angular discontinuities or "corners."

In further preferred forms, the respective angles are equal, and such angles are defined by 20% of the associated flighting depth, measured from the outer peripheries of the adjacent flighting portions. In some instances the respective angles at the outer peripheries are essentially 90° relative to the longitudinal axis of the screw assembly.

In particularly preferred forms, the screw assembly includes at least a pair of the improved screw sections of the invention, with one of such improved sections having a greater pitch than the other of the improved screw sections. The extruders of the invention can also be improved through the use of adjustable, flow-restricting valves along the length of the extruder barrel, and preferably located closer to the restricted die outlet than the improved screw section(s).

In other embodiments, the extruders hereof may include a disrupting/homogenizing screw section including a plurality of relatively short, flighted screw parts, with adjacent ones of the screw parts having an opposite pitch.

The single screw extruders of the invention are advantageously used in conjunction with a preferred preconditioner of a type disclosed in U.S. patent application Ser. No. 11/875,033, filed Oct. 19, 2007, entitled "Improved Preconditioner Having Independently Driven High-Speed Mixer Shafts," incorporated by reference herein. Broadly, such preconditioners comprise an elongated mixing vessel having an inlet and an outlet, the vessel outlet adapted for operable connection with the inlet of an extruder barrel. The preconditioners also have a pair of elongated mixing shafts within the vessel, each having a plurality of mixing elements, and with the shafts located in laterally spaced apart relationship within the vessel. A pair of variable drive mechanisms are operably coupled with the corresponding shafts in order to permit selective rotation of the shafts at individual rotational speeds independent of each other. A control device is operably coupled with the drive mechanisms to independently control the rotational speed of the shafts.

Preferably, the drive mechanisms include individual variable frequency drives operably coupled with the mixing shafts, and designed so as to allow rotation of the shafts in opposite rotational directions respectively.

BRIEF DESCRIPTION OF THE DRAWINGS

FIG. 2 is a fragmentary vertical sectional view of the single screw extruder illustrated in FIG. 1;

FIG. 3 is an enlarged, fragmentary, vertical sectional view of the third screw section of the extruder illustrated in FIGS. 1-2;

FIG. 4 is an enlarged, fragmentary, vertical sectional view of the fourth screw section of the extruder illustrated in FIGS. 1-2;

FIG. 5 is an enlarged, fragmentary, vertical sectional view of the fifth screw section of the extruder illustrated in FIGS. 1-2;

FIG. 6 is a fragmentary, vertical sectional view similar to that of FIG. 2 illustrating another single screw extruder embodiment equipped with alternating pitch screw elements in the third screw section thereof;

FIG. 7 is a vertical sectional view of the third screw section of the extruder illustrated in FIG. 6;

FIG. 8 is an exploded perspective view depicting the construction of the alternating pitch screw elements of the third screw section of the FIG. 6 extruder;

DETAILED DESCRIPTION OF THE PREFERRED EMBODIMENT

Figure 1:
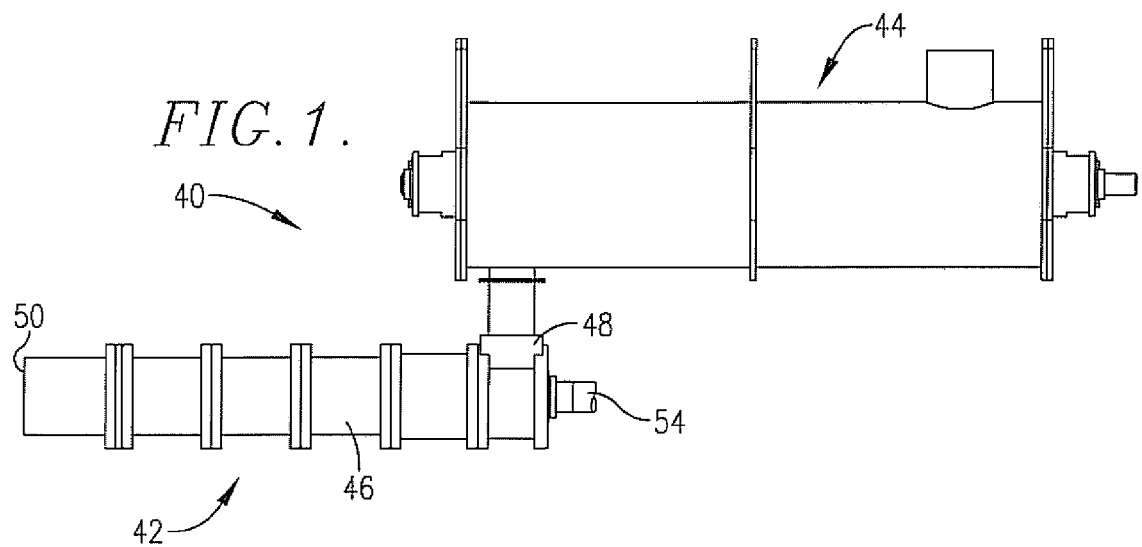
FIG. 1 is a side elevational view of a preconditioner and single screw extruder combination in accordance with the invention.

Turning now to the drawings, an extruder system 40 is illustrated in FIG. 1, and broadly includes a multiple-section single screw extruder 42 as well as an upstream preconditioner 44. The extruder 42 includes an elongated, multiple-head barrel 46 presenting an inlet 48 and an endmost restricted orifice die outlet 50. Internally, the extruder 42 has an elongated, helically flighted, axially rotatable screw assembly 52 (FIG. 2) mounted on a central shaft 54 operably coupled with a drive motor and gear reducer assembly (not shown).

The single screw extruder 42 is made up of an inlet head 56 including inlet 48, as well as four intermediate heads 58, 60, 62, and 64, and an outlet head 66. The heads 56-66 are end-to-end interconnected to cooperatively define a central region 68 extending from inlet 48 to die outlet 50. Additionally, it will be seen that the heads 58-62 and 66 are equipped with internal, helically ribbed sleeves 58a, 60a, 62a, and 66a whereas head 64 has a tubular, unribbed sleeve 64a. A selectively adjustable mid-barrel valve (MBV) assembly 65 is sandwiched between heads 64 and 66, although it could be located between any adjacent heads save for the inlet heads. This assembly 65 is of the type illustrated in U.S. Patent Publication No. US 2007/0237850, dated Oct. 11, 2007, and incorporated by reference herein.

The screw assembly 52 includes a pair of first and second inlet sections 70 and 72, improved third and fourth screw sections 74 and 76, a compressive fifth section 78, and a final, conical, cut-flight terminal sixth section 80. A series of conventional steamlock elements 81 are located between the screw sections 72, 74, 76, and 78 as shown.

Figure 9:
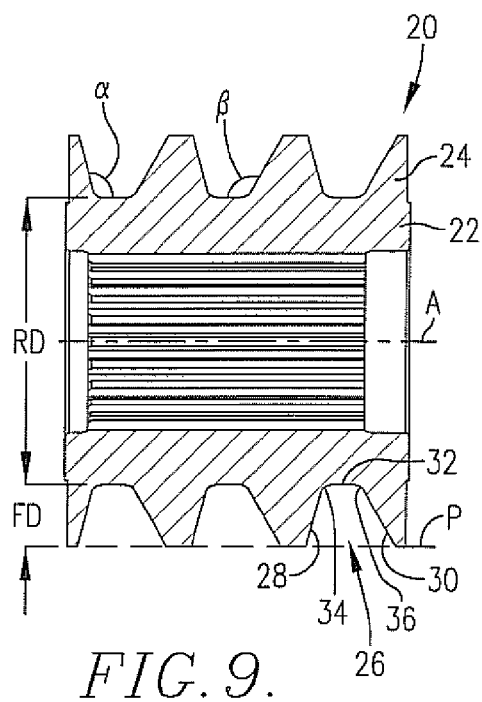
FIG. 9 is a vertical sectional view of a prior art single screw extruder screw section.
Figure 10:
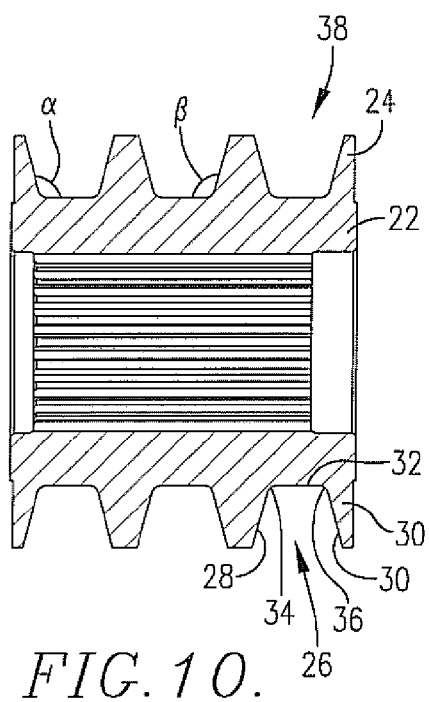
FIG. 10 is a vertical sectional view of another prior art single screw extruder screw section.

Referring to FIG. 4, the details of fourth section 76 are illustrated. Just as in the case of conventional screw sections as illustrated in FIGS. 9 and 10, the section 76 includes a central, tubular body 82 with internal splines 84 for mounting on shaft 54, and dual-lead helical flighting 86 extending outwardly from central body 82. Considering adjacent flighting portions 86a and 86b in FIG. 4, it will be observed that a surface 88 extends from and interconnects the outer peripheries of the portions 86a, 86b. The surface 88 is substantially smooth and arcuate throughout, and is devoid of any significant angular discontinuities or "corners." Furthermore, it will be noted that as the surface 88 approaches the outer peripheries 90a, 90b of the portions 86a, 86b, the angles defined between the surface 88 and such peripheries 90a, 90b is very steep, ranging from about 75-90° relative to the longitudinal axis of the screw assembly. Stated otherwise, the surface 88 includes first and second surface segments 88a and 88b respectively extending inwardly from the peripheries 90a, 90b of the flighting portions and towards central body 82. A third surface segment 88c interconnects the inwardly extending segments 88a and 88b to produce the smooth, arcuate surface 88. The steep angles between the surfaces 88a and 88b and the adjacent outer flighting portion peripheries 90a, 90b are normally defined by the angular orientation of the outer 20% of the surfaces 88a and 88b, i.e., the outer 20% of the flighting depth defined between the outer peripheries 90a, 90b and the root diameter of central body 82.

FIG. 3 likewise depicts the details of third screw section 74 which is similar in most respects to section 76 and thus like reference numerals are employed. It will be seen, however, that in the FIG. 3 screw section 74, the pitch of the flighting 86 is significantly less than that of screw section 76. This in turn means that the surface segments 88c are of lesser length in screw section 74 as compared with screw section 76. Nonetheless, the overall surfaces 88 in screw section 74 are smooth and arcuate and without any substantial angular discontinuities, and the angular relationships between the surface segments 88a and 88b and the corresponding outer peripheries 90a and 90b are the same.

FIG. 5 illustrates the details of the fifth screw section 78. This screw section features a flighting depth between the outer peripheries of the flighting portions and the central body which decreases from right to left. This serves to compress the material as it is conveyed by this screw section.

A second extruder embodiment 92 is illustrated in FIG. 6. The extruder 92 is in many respects identical with extruder 42, and where appropriate like reference numerals are employed. The only difference between the extruders 42 and 92 is in the make up of the third screw section, denominated as section 74a and illustrated in detail in FIGS. 7 and 8.

Specifically, the screw section 74 includes an internally splined inlet section 94 as well as a similarly splined downstream disrupting/homogenizing section 96. The section 94 is simply a short segment of the section 76 described previously, whereas the section 96 includes a plurality of flighted screw parts 96a, 96b, 96c, and 96d mounted on shaft 54 in abutting relationship. As best seen in FIG. 8, the adjacent parts 96a-96d are of alternating pitch, e.g., the part 96a has a right-hand pitch, while part 96b has a left-hand pitch. The purpose of the disruptive/homogenizing section 96 is to cut and disrupt the flow of material through the extruder 92 to thereby achieve a more uniform end extrudate.

Figure 11:
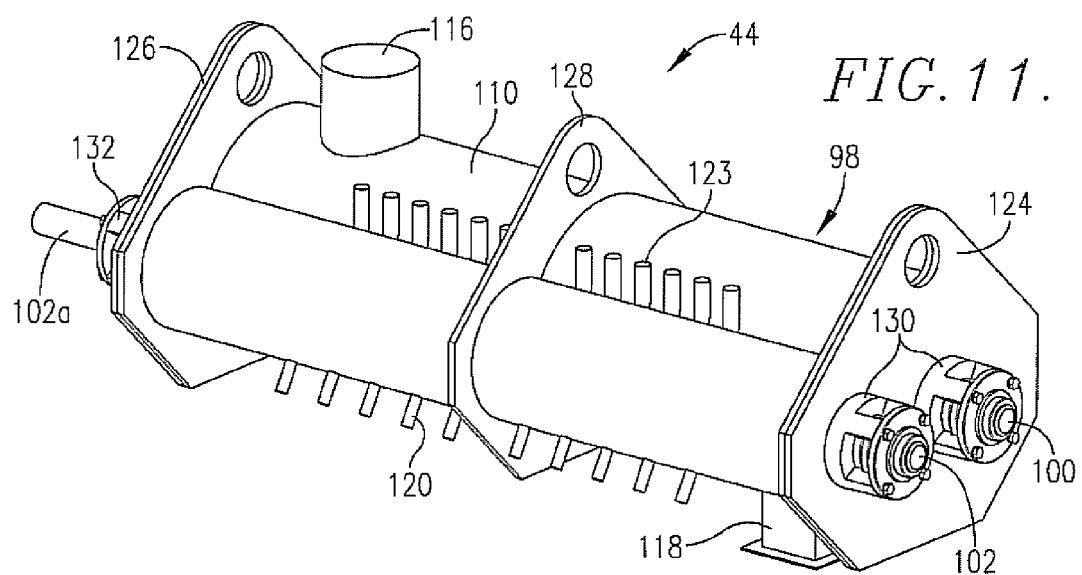
FIG. 11 is a perspective view of a preferred preconditioner in accordance with the invention.
Figure 12:
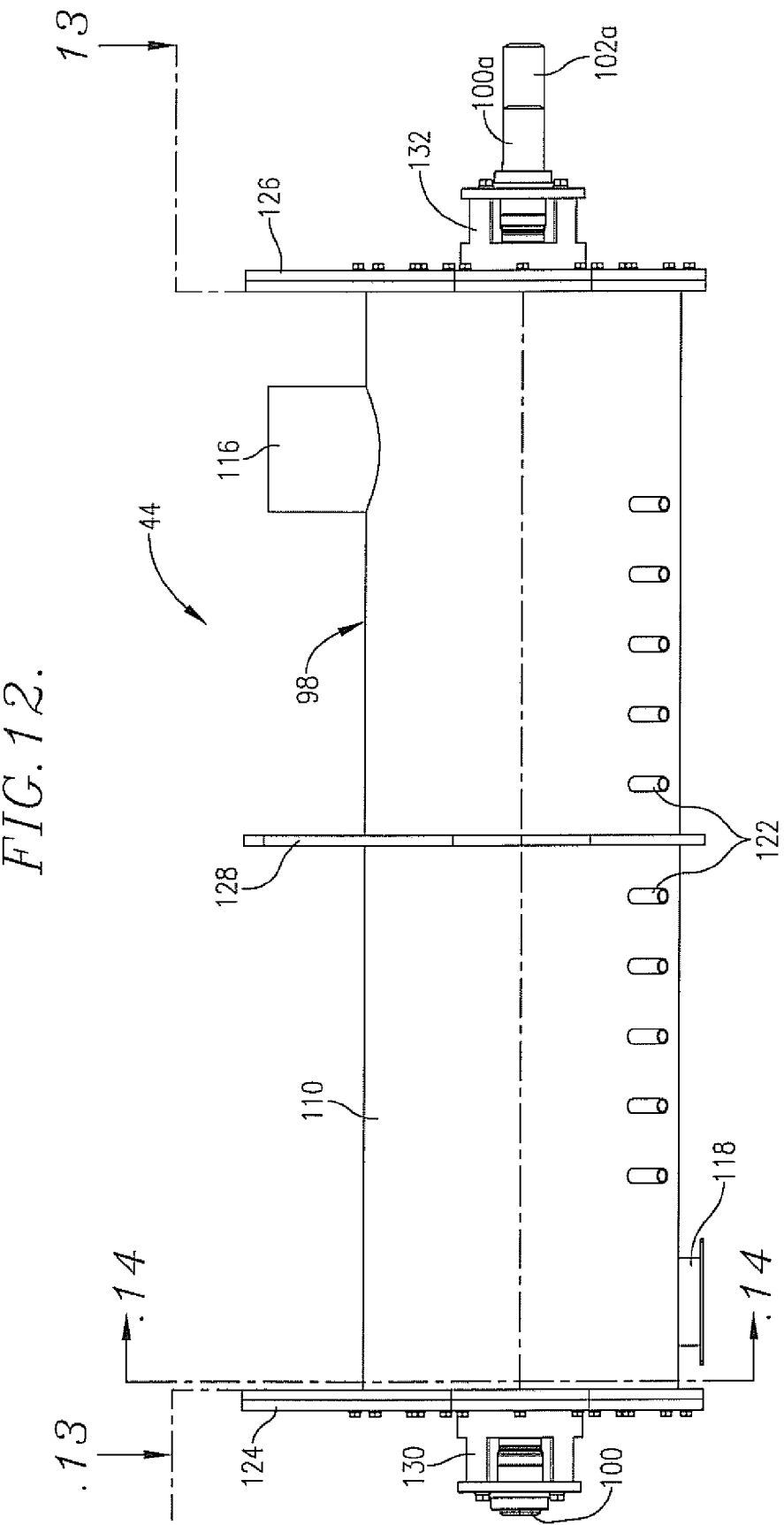
FIG. 12 is a side elevational view of the preconditioner illustrated in FIG. 11.
Figure 13:
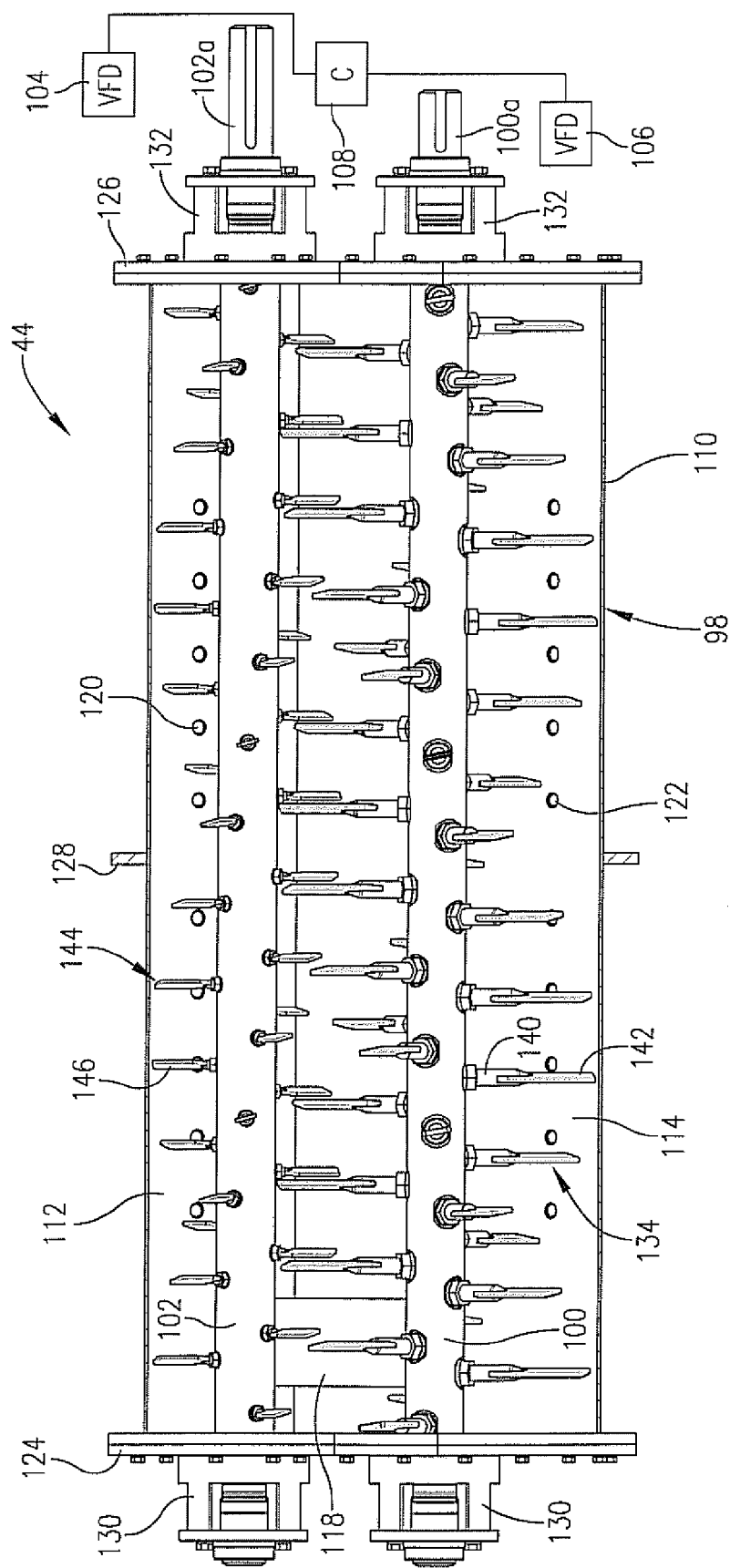
FIG. 13 is a sectional view taken along line 13-13 of FIG. 12.

The preconditioner 44 is illustrated in FIGS. 11-13, includes an elongated, dual-stage mixing vessel 98 with a pair of parallel, elongated, axially extending and rotatable mixing shafts 100 and 102 along the length thereof. The shafts 100, 102 are coupled with individual variable drive devices 104, 106, in turn connected to a control device 108 (FIG. 13). In practice, the drive devices 104, 106 are each coupled with a corresponding motor and gear reducer (not shown).

In preferred practice, the devices 104, 106 are in the form of variable speed drives. The control device 108 may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The drives devices 104, 106 may be programmed as desired to achieve the ends of the invention, e.g., they may be configured for different rotational speed ranges, rotational directions and power ratings.

The vessel 98 has an elongated, transversely arcuate sidewall 110 presenting a pair of elongated, juxtaposed, interconnected chambers 112 and 114, as well as a material inlet 116 and a material outlet 118. The chamber 114 has a larger cross sectional area than the adjacent chamber 112, which is important for reasons to be described. Each of the chambers 112, 114 is equipped with a series of spaced apart inlet ports 120, 122 along the lengths of the corresponding chambers, and an intermediate set of ports 123 is located at the juncture of the chambers 112, 114. These ports 120, 122 are adapted for connection of water and/or steam injectors leading to the interiors of the chambers. The overall vessel 104 further has fore and aft end plates 124 and 126, as well as, a central plate 128.

As illustrated, the shafts 100, 102 are essentially centrally located within the corresponding chambers 114, 112. To this end, forward bearings 130 mounted on plate 124 support the forward ends of the shafts 100, 102, and similarly rear bearings 132 secured to plate 126 support the rear ends of the shafts. The shafts 100, 102 have rearwardly extending extensions 100a, 102a projecting from the bearings 132 to provide a connection to the variable frequency drives previously described.

Figure 14:
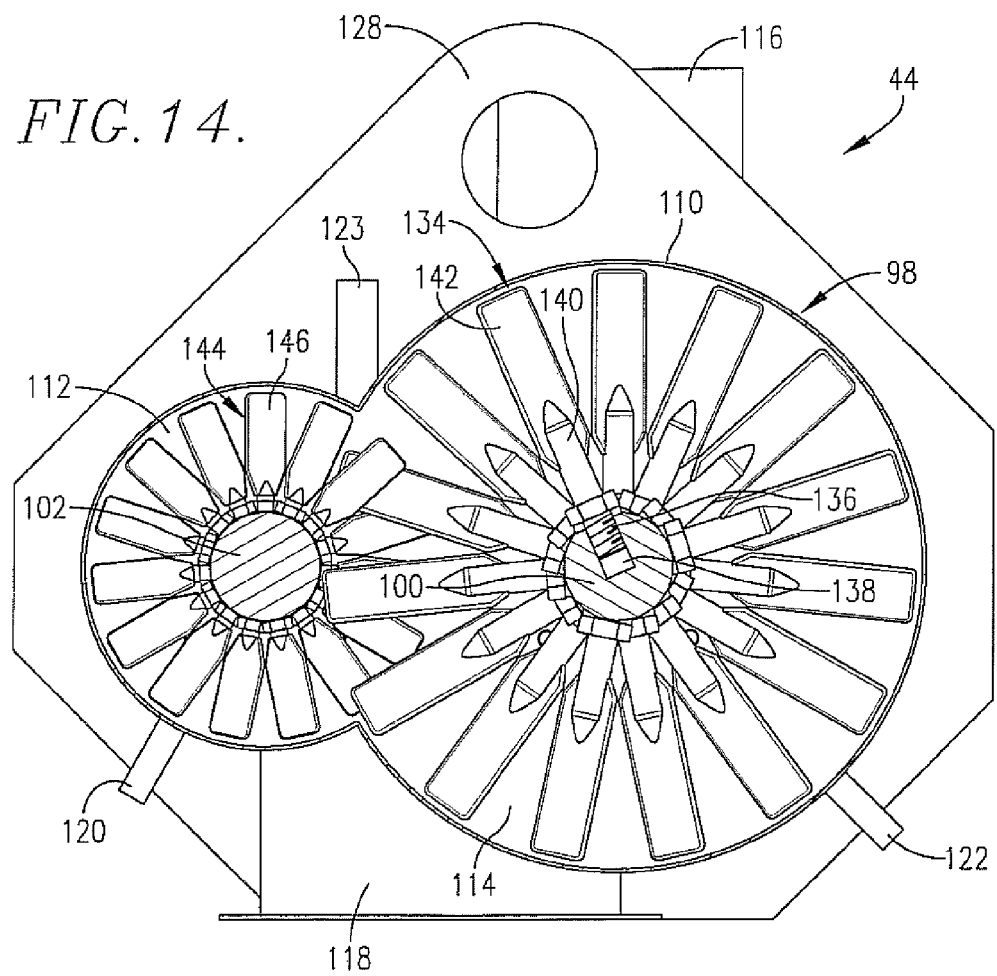
FIG. 14 is a sectional view taken along line 14-14 of FIG. 12.

The shaft 100 is equipped with a plurality of radially outwardly extending mixing elements 134 located in staggered relationship along the length of the shaft. Each of the elements 134 (FIG. 14) includes a threaded inboard segment 136 received within a correspondingly threaded bore 138 of the shaft 100, with an outwardly projecting segment 140 having a substantially flat, paddle-like member 142. As best seen in FIG. 13, the paddle members 142 of the mixing elements 134 are oriented in a reverse direction relative to the direction of travel of material from inlet 116 to outlet 118. That is, these members serve to retard the flow of material through the preconditioner 44.

The shaft 102 situated within smaller chamber 112 likewise has a series of mixing elements 144 along the length thereof in alternating, staggered relationship. The elements 144 are identical with the elements 134, save that the elements 144 are somewhat smaller in size. Each element 144 presents an outboard paddle-like member 146. In this case, the members 146 are oriented opposite that of the members 142, i.e., they are oriented in a forward direction so as to more positively advance the flow of material from inlet 116 toward and out the outlet 118.

As in the case of the earlier described embodiments, adjacent pairs of mixing elements 134 and 144 are axially offset from each other and are intercalated; thus the elements are not of self-wiping design. This allows the shafts to be rotated at greatly different rotational speeds, while avoiding any potential lock-up owing to mechanical interference between the elements 134 and 144.

The preconditioner designs of the present invention permit processing of materials to a greater degree than heretofore possible. For example, prior preconditioners of the type described in U.S. Pat. No. 4,752,139 could not be field-adjusted to achieve different relative rotational speeds between the shafts thereof. That is, in such prior preconditioners, once a rotational speed differential was established during manufacture of the device, it could not thereafter be altered without a complete reconstruction of the device. Normal preconditioners of this type had a speed differential of 2:1 between the shafts within the small and large chambers, respectively. In the present invention, however, far greater and infinitely adjustable speed differentials can be readily accomplished. Thus, in preferred forms the speed differential between the shafts 100, 102 is at least 5:1, and typically ranges from 3:1 to 18:1, with the smaller diameter shaft 102 normally rotating at a higher speed than that of the larger chamber shaft 100. This latter differential corresponds to a rotational speed of 900 rpm for the shaft 102, and 50 rpm for the shaft 100.

This enhanced design affords a number of processing advantages. To give one example, in the prior preconditioner design of the '139 patent, the maximum degree of cook achievable was normally about 30%, with a maximum of about 43% (measured by gelatinization of starch components according to the method described in Mason et al., *A New Method for Determining Degree of Cook,* 67th Annual Meeting, American Association of Cereal Chemists (Oct. 26, 1982), incorporated by reference herein). With the present invention however, significantly greater cook percentages can be achieved, of at least 50% and more preferably at least 55%, and most preferably at least about 75%. At the same time, these enhanced cook values are obtained with the same or even shorter residence times as compared with the prior preconditioners; specifically, such prior designs would require a retention time of from about 160-185 seconds to obtain maximum cook values, whereas in the present preconditioners the retention times are much less, on the order of 120-150 seconds, to achieve this same cook. Further, if the longer typical preconditioner residence times are used, the extent of cook values are normally significantly increased.

In one form of the invention, human food or animal feed mixtures containing respective quantities of protein and starch (and normally other ingredients such as fats and sugars) are processed in the preconditioners of the invention to achieve at least about 50%, and more preferably at least about 75% cook values based upon starch gelatinization. Representative examples of such mixtures are pet and fish feeds. The preconditioner of the invention also give enhanced Specific Mechanical Energy (SME) values. Prior preconditioners typically exhibited relatively low SME values whereas the preconditioner hereof have increased SME values of from about 1.7-5.0, more preferably from about 1.9-4.5 kW-Hr/Ton of processed starting materials.

It is well understood in the art that increasing the degree of cook in a preconditioner is advantageous in that less energy and retention times are required during downstream processing to achieve a desired, fully cooked product such as a pet food. Thus, use of preconditioners in accordance with the invention increases product throughput and thus materially reduces processing costs.

The advantages of the preconditioners of the invention are further enhanced when used in combination with the improved single screw extruders described previously. This combination affords very high cook values (on the order of 90-100%), coupled with high SME values and smooth, substantially surge-free extruder performance. The single screw extruders of the invention having the improved arcuate screw sections operate much in the manner of self-wiping twin screw extruders, which augments the beneficial effects obtained with such extruders. Additionally, higher moisture level starting products can also be successfully processed using the systems of the invention.

The following examples set forth results obtained using the single screw extruders and preconditioners of the invention. It is to be understood, however, that these examples are provided by way of illustration and nothing therein should be taken as a limitation upon the overall scope of the invention.

EXAMPLE 1

A series of comparative extruder runs were performed, in order to determine the SME values and bulk densities of high-fat puppy food products obtained in the preferred extruder setup of the present invention as set illustrated in FIG. 2, versus a conventional single screw pet food setup. The extruder setups included a standard Wenger DDC preconditioner of the type depicted and described in U.S. Pat. No. 4,752,139. The recipe was a commercial puppy feed recipe and gave 31% by weight starch, 1.5% by weight fiber, 11% by weight fat, and 35% by weight protein.

In these extrusion runs, the recipe ingredients were first preconditioned in the preconditioner with steam, water, and oil being injected into the preconditioner vessel. This served to at least partially cook the recipe and gelatinize the starch-bearing components thereof. After preconditioning, the material was fed to the inlet of the extruder barrel, whereupon it was conveyed through the barrel and out the restricted orifice die. During such treatment, water and steam were injected into the extruder barrel at locations along the length thereof. The back pressure valve was opened to various extents during the runs. After extrusion the products were dried in a conventional multi-pass dryer.

Table 1 below sets forth the results of these tests, where runs R1 and R5 are directly comparable, as are runs R2/R6, R3/R7, and R4/R8. The odd-numbered runs involved a standard prior art single screw setup for pet foods, whereas the even-numbered runs involved the FIG. 2 setup. The comparative runs were carried out to achieve as far as possible the same processing conditions, so that SME and product density differences are attributable to the comparative extruder setups.

TABLE 1

|  | Units | Run 1 | Run 5 | Run 2 | Run 6 | Run 3 | Run 7 | Run 4 | Run 8 |
| --- | --- | --- | --- | --- | --- | --- | --- | --- | --- |
| Dry Rate | kg/hr | 500 | 500 | 750 | 750 | 750 | 750 | 1000 | 1000 |
| Steam Flow to Preconditioner | kg/hr | 1.3 | 1.4 | 2.0 | 2.0 | 2.0 | 2.0 | 2.4 | 2.5 |
| Water flow to Preconditioner | kg/hr | 6.7 | 7 | 6.7 | 7 | 7 | 7 | 8 | 8 |
| Oil Flow to Preconditioner | kg/hr | 4 | 4 | 4 | 4 | 4 | 4 | 4 | 4 |
| Preconditioner Discharge Temp | °C. | 84 | 81 | 82 | 80 | 82 | 80 | 77 | 77 |
| Water Flow to Extruder | kg/hr | 5.6 | 5.9 | 10.2 | 9.9 | 10.2 | 9.9 | 9.6 | 9.5 |
| Steam Flow to Extruder | kg/hr | 1.5 | 1.4 | 1.2 | 1.1 | 1.2 | 1.1 | 1.5 | 1.4 |
| Extruder Shaft Speed | rpm | 550 | 550 | 550 | 550 | 550 | 550 | 550 | 550 |
| Extruder Motor Load | % | 33 | 53 | 48 | 57 | 56 | 71 | 63 | 72 |
| Mid-Barrel Valve | % Open | 20 | 20 | 20 | 20 | 7 | 7 | 10 | 10 |
| Temperature 2nd Head | °C. | 47 | 50 | 44 | 50 | 48 | 51 | 48 | 49 |
| Temperature 3rd Head | °C. | 65 | 64 | 61 | 63 | 63 | 66 | 66 | 64 |
| Temperature 4th Head | °C. | 84 | 92 | 92 | 88 | 90 | 90 | 88 | 90 |
| Temperature 5th Head | °C. | 85 | 86 | 83 | 84 | 85 | 87 | 96 | 87 |
| Temperature 6th Head | °C. | 92 | 75 | 105 | 79 | 105 | 76 | 105 | 76 |
| Pressure Head 6 | Bar | 31 | 35 | 42 | 40 | 55 | 60 | 65 | 65 |
| Specific Mechanical Energy | kw-hr/mt | 49 | 79 | 48 | 47 | 56 | 71 | 47 | 54 |
| Extruder Discharge Wet Bulk Density | kg/m$^3$ | 510 | 440 | 500 | 435 | 390 | 380 | 510 | 425 |
| Dryer Discharge Dry Bulk Density | kg/m$^3$ | 460 | 380 | 425 | 368 | 350 | 340 | 510 | 380 |

As can be seen, the screw configuration of the present invention gave consistent and significantly higher SME values as compared with the old design, and likewise the wet and dry bulk densities of the extrudates was significantly lower.

EXAMPLE 2

In this series of tests the preferred single screw assemblies of the invention were compared with conventional screw assemblies. In all cases the extruder was a Wenger X165 7-head single screw extruder of different configurations was used, along with an upstream Wenger preconditioner, and the pet food recipe used was: 32% by weight corn; 27.5% by weight poultry meal; 18% by weight wheat; 16% by weight wheat middlings; 6% by weight fish meal; and 0.5% by weight salt.

A total of four different extruder system configurations were used in these tests, as follows: A=standard single screw configuration with uncut terminal cone screw; B=single screw configuration of the invention with uncut terminal cone screw; C=standard single screw configuration with cut-flight terminal cone screw; D=single screw configuration of the invention with cut-flight terminal cone screw.

The following Table 2 sets forth the results of these runs. Generally speaking, the data confirms that the new, arcuate single screw extruder elements of the present invention gave more positive conveyance of material through the extruder, resulting in higher pressures at the discharge die. Correspondingly, these new screw elements gave lower pressures in the barrel inlet and at the steam injection sites, meaning that higher steam injection levels can be used. Moreover, the new screw elements caused the same or higher SME values as compared with conventional single screw elements, even though the former gave more positive conveyance. Thus, the new screw elements improve material conveyance without loss of mixing.

TABLE 2

| | | Run Number | | | | | |
| --- | --- | --- | --- | --- | --- | --- | --- |
| | | 1 | 2 | 3 | 4 | 5 | 6 |
| | | | | Configuration | | | |
| | Units | A | A | A | A | A | B |
| Dry Recipe Parameters | | | | | | | |
| Dry Recipe Moisture Content | % wb | 10 | 10 | 10 | 10 | 10 | 10 |
| Dry Recipe Temperature | °C. | 25 | 25 | 25 | 25 | 25 | 25 |
| Dry Recipe Rate | kg/hr | 1992 | 2000 | 1991 | 1999 | 2007 | 2002 |
| Preconditioner Parameters | | | | | | | |
| Steam Flow to Preconditioner | kg/hr | 180 | 182 | 177 | 180 | 184 | 190 |
| Adjusted Steam Flow to Preconditioner | kg/hr | 99 | 110 | 115 | 118 | 116 | 118 |
| Water Flow to Preconditioner | kg/hr | 203 | 201 | 203 | 204 | 202 | 202 |
| Process Water Temperature | °C. | 18 | 18 | 18 | 18 | 18 | 18 |
| Oil Addition | kg/hr | 0 | 0 | 0 | 0 | 0 | 0 |
| Oil Temperature | °C. | 40 | 40 | 40 | 40 | 40 | 40 |
| Recorded DDC Discharge Temperature | °C. | 78 | 83 | 86 | 87 | 86 | 87 |
| Preconditioner Discharge Moisture | % wb | 22.6 | 21.4 | 24.01 | 23.24 | 23.58 | 22.78 |
| Extruder Barrel Parameters | | | | | | | |
| Extruder Shaft Speed | rpm | 417 | 418 | 537 | 537 | 537 | 537 |
| Motor Load | % | 47 | 52 | 47 | 49 | 74 | 62 |
| Steam Flow to Extruder | kg/hr | 79 | 80 | 80 | 80 | 80 | 80 |
| Water Flow to Extruder | kg/hr | 42 | 41 | 38 | 38 | 40 | 38 |
| Process Water Temperature | °C. | 18 | 18 | 18 | 18 | 18 | 18 |
| Extruder Motor Power | hp | 150 | 150 | 150 | 150 | 150 | 150 |
| Rated Shaft Speed | rpm | 422 | 422 | 422 | 422 | 422 | 422 |
| MBV Closure | % closed | 0 | 0 | 0 | 0 | 0 | 0 |
| Extruder Discharge Density | g/l | 417 | 365 | 384 | 390 | 359 | 365 |
| Extruder Discharge Moisture | % wb | 24.3 | 24.1 | 24 | 25 | 23 | 26 |
| Dry Recipe Calculations | | | | | | | |
| Dry Recipe Specific Heat | kJ/kg·°C. | 1.769 | 1.769 | 1.769 | 1.769 | 1.769 | 1.769 |
| Dry Recipe Energy | kJ/hr | 88096 | 88450 | 88052 | 88406 | 88760 | 88538 |
| Preconditioner Calculations | | | | | | | |
| Steam Enthalpy | kJ/kg | 2721 | 2721 | 2721 | 2721 | 2721 | 2721 |
| Steam Energy | kJ/hr | 27046 | 29796 | 31404 | 32135 | 31578 | 32078 |
| Water Energy | kJ/hr | 15299 | 15149 | 15299 | 15375 | 15224 | 15224 |

| | | Run Number | | | | |
| --- | --- | --- | --- | --- | --- | --- |
| | | 7 | 8 | 9 | 10 | 13 |
| | | | | Configuration | | |
| | Units | B | B | B | B | D |
| Dry Recipe Parameters | | | | | | |
| Dry Recipe Moisture Content | % wb | 10 | 10 | 10 | 10 | 10 |
| Dry Recipe Temperature | °C. | 25 | 25 | 25 | 25 | 25 |
| Dry Recipe Rate | kg/hr | 2007 | 2001 | 1999 | 2017 | 2990 |

TABLE 2-continued

| Preconditioner Parameters | | | | | | |
|---|---|---|---|---|---|---|
| Steam Flow to Preconditioner | kg/hr | 180 | 179 | 179 | 180 | 270 |
| Adjusted Steam Flow to Preconditioner | kg/hr | 106 | 101 | 111 | 124 | 185 |
| Water Flow to Preconditioner | kg/hr | 201 | 197 | 200 | 197 | 301 |
| Process Water Temperature | °C. | 18 | 18 | 18 | 18 | 18 |
| Oil Addition | kg/hr | 0 | 0 | 0 | 0 | 0 |
| Oil Temperature | °C. | 40 | 40 | 40 | 40 | 40 |
| Recorded DDC Discharge Temperature | °C. | 81 | 79 | 84 | 90 | 90 |
| Preconditioner Discharge Moisture | % wb | 21.4 | 21.8 | 23.85 | 24.24 | 23.48 |
| Extruder Barrel Parameters | | | | | | |
| Extruder Shaft Speed | rpm | 537 | 537 | 537 | 537 | 537 |
| Motor Load | % | 50 | 49 | 56 | 62 | 86 |
| Steam Flow to Extruder | kg/hr | 80 | 80 | 80 | 80 | 120 |
| Water Flow to Extruder | kg/hr | 39 | 38 | 39 | 40 | 60 |
| Process Water Temperature | °C. | 18 | 18 | 18 | 18 | 18 |
| Extruder Motor Power | hp | 150 | 150 | 150 | 150 | 150 |
| Rated Shaft Speed | rpm | 422 | 422 | 422 | 422 | 422 |
| MBV Closure | % closed | 0 | 0 | 70 | 70 | 75 |
| Extruder Discharge Density | g/l | 397 | 377 | 358 | 357 | 340 |
| Extruder Discharge Moisture | % wb | 24.4 | 23.8 | 24 | 23 | 24 |
| Dry Recipe Calculations | | | | | | |
| Dry Recipe Specific Heat | kJ/kg · °C. | 1.769 | 1.769 | 1.769 | 1.769 | 1.769 |
| Dry Recipe Energy | kJ/hr | 88760 | 88494 | 88406 | 89202 | 13223 |
| Preconditioner Calculations | | | | | | |
| Steam Enthalpy | kJ/kg | 2721 | 2721 | 2721 | 2721 | 2721 |
| Steam Energy | kJ/hr | 28740 | 27504 | 30312 | 33853 | 50428 |
| Water Energy | kJ/hr | 15149 | 14847 | 15073 | 14847 | 22685 |

| | | Run Number | | | | |
|---|---|---|---|---|---|---|
| | | 14 | 15 | 16 | 17 | 18 |
| | | | | Configuration | | |
| | Units | D | D | D | D | D |
| Dry Recipe Parameters | | | | | | |
| Dry Recipe Moisture Content | % wb | 10 | 10 | 10 | 10 | 10 |
| Dry Recipe Temperature | °C. | 25 | 25 | 25 | 25 | 25 |
| Dry Recipe Rate | kg/hr | 2010 | 2006 | 1992 | 1992 | 1997 |
| Preconditioner Parameters | | | | | | |
| Steam Flow to Preconditioner | kg/hr | 180 | 180 | 179 | 180 | 181 |
| Adjusted Steam Flow to Preconditioner | kg/hr | 114 | 127 | 123 | 119 | 114 |
| Water Flow to Preconditioner | kg/hr | 198 | 205 | 197 | 196 | 204 |
| Process Water Temperature | °C. | 18 | 18 | 18 | 18 | 18 |
| Oil Addition | kg/hr | 0 | 0 | 0 | 0 | 0 |
| Oil Temperature | °C. | 40 | 40 | 40 | 40 | 40 |
| Recorded DDC Discharge Temperature | °C. | 85 | 91 | 90 | 88 | 85 |
| Preconditioner Discharge Moisture | % wb | 24.82 | 23.32 | 22.69 | 22.05 | 23.55 |
| Extruder Barrel Parameters | | | | | | |
| Extruder Shaft Speed | rpm | 537 | 537 | 537 | 537 | 537 |
| Motor Load | % | 61 | 70 | 95 | 75 | 67 |
| Steam Flow to Extruder | kg/hr | 80 | 80 | 80 | 80 | 80 |
| Water Flow to Extruder | kg/hr | 42 | 40 | 40 | 40 | 39 |
| Process Water Temperature | °C. | 18 | 18 | 18 | 18 | 18 |
| Extruder Motor Power | hp | 150 | 150 | 150 | 150 | 150 |
| Rated Shaft Speed | rpm | 422 | 422 | 422 | 422 | 422 |
| MBV Closure | % closed | 80 | 80 | 80 | 80 | 85 |
| Extruder Discharge Density | g/l | 347 | 345 | 333 | 362 | 335 |
| Extruder Discharge Moisture | % wb | 24 | 24 | 23 | 23 | 24 |
| Dry Recipe Calculations | | | | | | |
| Dry Recipe Specific Heat | kJ/kg · °C. | 1.769 | 1.769 | 1.769 | 1.769 | 1.769 |
| Dry Recipe Energy | kJ/hr | 88892 | 88715 | 88096 | 88096 | 88317 |
| Preconditioner Calculations | | | | | | |
| Steam Enthalpy | kJ/kg | 2721 | 2721 | 2721 | 2721 | 2721 |
| Steam Energy | kJ/hr | 309280 | 345276 | 33490 | 32335 | 30965 |
| Water Energy | kJ/hr | 14922 | 15450 | 14847 | 14722 | 15375 |

TABLE 2-continued

|  | Units | Run Number | | | | | |
|---|---|---|---|---|---|---|---|
|  |  | 19 | 20 | 21 | 22 | 23 | 24 |
|  |  | Configuration | | | | | |
|  |  | C | C | C | C | C | C |
| Dry Recipe Parameters | | | | | | | |
| Dry Recipe Moisture Content | % wb | 10 | 10 | 10 | 10 | 10 | 10 |
| Dry Recipe Temperature | ° C. | 25 | 25 | 25 | 25 | 25 | 25 |
| Dry Recipe Rate | kg/hr | 1999 | 1998 | 2001 | 2007 | 2001 | 1991 |
| Preconditioner Parameters | | | | | | | |
| Steam Flow to Preconditioner | kg/hr | 180 | 180 | 180 | 180 | 179 | 180 |
| Adjusted Steam Flow to Preconditioner | kg/hr | 124 | 124 | 120 | 113 | 129 | 126 |
| Water Flow to Preconditioner | kg/hr | 199 | 199 | 201 | 205 | 204 | 201 |
| Process Water Temperature | ° C. | 18 | 18 | 18 | 18 | 18 | 18 |
| Oil Addition | kg/hr | 0 | 0 | 0 | 100 | 100 | 100 |
| Oil Temperature | ° C. | 40 | 40 | 40 | 40 | 40 | 40 |
| Recorded DDC Discharge Temperature | ° C. | 90 | 90 | 88 | 83 | 91 | 90 |
| Preconditioner Discharge Moisture | % wb | 22.22 | 23.07 | 22.88 | 22.27 | 22.36 | 20.93 |
| Extruder Barrel Parameters | | | | | | | |
| Extruder Shaft Speed | rpm | 537 | 537 | 537 | 537 | 537 | 537 |
| Motor Load | % | 76 | 97 | 78 | 60 | 67 | 87 |
| Steam Flow to Extruder | kg/hr | 80 | 80 | 80 | 80 | 80 | 80 |
| Water Flow to Extruder | kg/hr | 39 | 39 | 41 | 39 | 40 | 39 |
| Process Water Temperature | ° C. | 18 | 18 | 18 | 18 | 18 | 18 |
| Extruder Motor Power | hp | 150 | 150 | 150 | 150 | 150 | 150 |
| Rated Shaft Speed | rpm | 422 | 422 | 422 | 422 | 422 | 422 |
| MBV Closure | % closed | 85 | 85 | 85 | 85 | 85 | 85 |
| Extruder Discharge Density | g/l | 339 | 314 | 361 | 385 | 413 | 411 |
| Extruder Discharge Moisture | % wb | 23 | 23 | 23 | 24 | 24 | 23 |
| Dry Recipe Calculations | | | | | | | |
| Dry Recipe Specific Heat | kJ/kg · ° C. | 1.769 | 1.769 | 1.769 | 1.769 | 1.769 | 1.769 |
| Dry Recipe Energy | kJ/hr | 88406 | 88362 | 88494 | 88760 | 88494 | 88052 |
| Preconditioner Calculations | | | | | | | |
| Steam Enthalpy | kJ/kg | 2721 | 2721 | 2721 | 2721 | 2721 | 2721 |
| Steam Energy | kJ/hr | 33618 | 33619 | 32583 | 30668 | 35223 | 34403 |
| Water Energy | kJ/hr | 14998 | 14998 | 15149 | 15450 | 15375 | 15149 |

TABLE 2A

| | Units | Run Number | | | | | | | | | | |
|---|---|---|---|---|---|---|---|---|---|---|---|---|
| | | 1 | 2 | 3 | 4 | 5 | 6 | 7 | 8 | 9 | 10 | 13 |
| | | A | A | A | A | A | B | B | B | B | B | D |
| | | | | | | | Configuration | | | | | |
| Oil Energy | kJ/hr | 0 | 0 | 0 | 0 | 0 | 0 | 0 | 0 | 0 | 0 | 0 |
| Calculated Moisture in Preconditioner | % wb | 21.9 | 22.1 | 22.4 | 22.5 | 22.3 | 22.4 | 21.9 | 21.7 | 22.1 | 22.4 | 22.6 |
| Specific Heat Adjustment Factor | kJ/kg · °C. | 0.00 | 0.00 | 0.00 | 0.00 | 0.00 | 0.00 | 0.00 | 0.00 | 0.00 | 0.00 | 0.00 |
| Specific Heat in Preconditioner | kJ/kg · °C. | 2.09 | 2.09 | 2.10 | 2.10 | 2.10 | 2.10 | 2.09 | 2.08 | 2.09 | 2.10 | 2.11 |
| Product Mass Flow in Preconditioner | kg/hr | 2294 | 2311 | 2309 | 2321 | 2325 | 2322 | 2314 | 2299 | 2310 | 2338 | 3476 |
| Thermal Energy Added in Preconditioner | kJ/hr | 285766 | 313110 | 329340 | 336727 | 331013 | 336005 | 302553 | 289893 | 318197 | 353378 | 526968 |
| Total Thermal Energy in Preconditioner | kJ/hr | 373862 | 401560 | 417392 | 425133 | 419773 | 424543 | 391313 | 378387 | 406603 | 442580 | 659201 |
| Specific Thermal Energy in Preconditioner (as is basis) | kJ/kg | 163 | 174 | 181 | 183 | 181 | 183 | 169 | 165 | 176 | 189 | 190 |
| Preconditioner Discharge Energy | kJ/hr | 373675 | 401570 | 417477 | 425075 | 419705 | 424613 | 391299 | 378330 | 406390 | 442381 | 659216 |
| Calculated Preconditioner Discharge Temperature | °C. | 78 | 83 | 86 | 87 | 86 | 87 | 81 | 79 | 84 | 90 | 90 |
| Calculated Preconditioner Retention Time | min | 3.07 | 3.05 | 3.07 | 3.06 | 3.04 | 3.05 | 3.04 | 3.05 | 3.06 | 3.03 | 2.04 |
| Extruder Barrel Calculations | | | | | | | | | | | | |
| Steam Enthalpy | kJ/kg | 2770 | 2770 | 2770 | 2770 | 2770 | 2770 | 2770 | 2770 | 2770 | 2770 | 2770 |
| Steam Energy | kJ/hr | 218830 | 221600 | 221600 | 221600 | 221600 | 221600 | 221600 | 221600 | 221600 | 221600 | 332400 |
| Water Energy | kJ/hr | 3165 | 3090 | 2864 | 2864 | 3015 | 2864 | 2939 | 2864 | 2939 | 3015 | 4522 |
| Total Mass Flow in Extruder Barrel | kg/hr | 2415 | 2432 | 2427 | 2439 | 2445 | 2440 | 2433 | 2417 | 2429 | 2458 | 3656 |
| Specific Heat in Extruder Barrel | kJ/kg · °C. | 2.193 | 2.199 | 2.204 | 2.204 | 2.201 | 2.204 | 2.191 | 2.185 | 2.196 | 2.204 | 2.209 |
| Thermal Energy Added in Extruder Barrel | kJ/hr | 221995 | 224690 | 224464 | 224464 | 224615 | 224464 | 224539 | 224464 | 224539 | 224615 | 336922 |
| Thermal Energy in Extruder Barrel | kJ/hr | 595671 | 626260 | 641941 | 649539 | 644320 | 649077 | 615838 | 602794 | 630930 | 666996 | 996138 |
| Extruder Motor Power | kW | 111.9 | 111.9 | 111.9 | 111.9 | 111.9 | 111.9 | 111.9 | 111.9 | 111.9 | 111.9 | 111.9 |
| Total Mechanical Energy | kJ/hr | 187091 | 207491 | 189335 | 197392 | 298102 | 249761 | 201420 | 197392 | 225590 | 249761 | 346442 |
| Total Energy | kJ/hr | 782762 | 833752 | 831276 | 846930 | 942421 | 898838 | 817258 | 800186 | 856520 | 916757 | 1342578 |
| Total Specific Energy (dry recipe basis) | kJ/kg | 393 | 417 | 418 | 424 | 470 | 449 | 407 | 400 | 428 | 455 | 449 |
| Calculated Moisture in Extruder Barrel | % wb | 25.8 | 26 | 26.2 | 26.2 | 26.1 | 26.2 | 25.7 | 25.5 | 25.9 | 26.2 | 26.4 |
| Specific Thermal Energy In Extruder Barrel (as is basis) | kJ/kg | 247 | 258 | 264 | 266 | 264 | 266 | 253 | 249 | 260 | 271 | 272 |
| Specific Mechanical Energy (as-is basis) | kJ/kg | 77 | 85 | 78 | 81 | 122 | 102 | 83 | 82 | 93 | 102 | 95 |
| Specific Mechanical Energy (as-is dry recipe basis) | kJ/kg | 94 | 104 | 95 | 99 | 149 | 125 | 100 | 99 | 113 | 124 | 116 |
| Specific Mechanical Energy (as-is dry recipe basis) | kW-hr/mton | 26.1 | 28.8 | 26 | 27 | 41 | 35 | 27.9 | 27.4 | 31 | 34 | 32 |
| Specific Thermal Energy (as-is dry recipe basis) | kJ/kg | 255 | 269 | 278 | 281 | 277 | 280 | 263 | 257 | 272 | 287 | 289 |
| Calculated Temperature Behind Die | °C. | 148 | 156 | 155 | 158 | 175 | 167 | 153 | 152 | 160 | 169 | 166 |

TABLE 2A-continued

| | Units | Run Number | | | | | | | | | | |
|---|---|---|---|---|---|---|---|---|---|---|---|---|
| | | 14 | 15 | 16 | 17 | 18 | 19 Configuration | 20 | 21 | 22 | 23 | 24 |
| | | D | D | D | D | D | C | C | C | C | C | C |
| Oil Energy | kJ/hr | 0 | 0 | 0 | 0 | 0 | 0 | 0 | 0 | 0 | 0 | 0 |
| Calculated Moisture in Preconditioner | % wb | 22.1 | 22.8 | 22.5 | 22.3 | 22.4 | 22.5 | 22.5 | 22.4 | 21.4 | 21.9 | 21.8 |
| Specific Heat Adjustment Factor | kJ/kg · °C. | 0.00 | 0.00 | 0.00 | 0.00 | 0.00 | 0.00 | 0.00 | 0.00 | 0.00 | 0.00 | 0.00 |
| Specific Heat in Preconditioner | kJ/kg · °C. | 2.09 | 2.11 | 2.10 | 2.10 | 2.10 | 2.10 | 2.10 | 2.10 | 2.08 | 2.09 | 2.09 |
| Product Mass Flow in Preconditioner | kg/hr | 2322 | 2338 | 2312 | 2307 | 2315 | 2322 | 2321 | 2322 | 2425 | 2434 | 2418 |
| Thermal Energy Added in Preconditioner | kJ/hr | 324202 | 360726 | 349751 | 338122 | 325027 | 351187 | 351197 | 340987 | 328837 | 374309 | 365884 |
| Total Thermal Energy in Preconditioner | kJ/hr | 413094 | 449441 | 437847 | 426218 | 413344 | 439593 | 439559 | 429481 | 417597 | 462803 | 453936 |
| Specific Thermal Energy in Preconditioner (as is basis) | kJ/kg | 178 | 192 | 189 | 185 | 179 | 189 | 189 | 185 | 172 | 190 | 188 |
| Preconditioner Discharge Energy | kJ/hr | 413233 | 449537 | 438024 | 426100 | 413585 | 439818 | 439630 | 429468 | 417596 | 462565 | 454037 |
| Calculated Preconditioner Discharge Temperature | °C. | 85 | 91 | 90 | 88 | 85 | 90 | 90 | 88 | 83 | 91 | 90 |
| Calculated Preconditioner Retention Time | min | 3.04 | 3.05 | 3.07 | 3.07 | 3.06 | 3.06 | 3.06 | 3.05 | 3.04 | 3.05 | 3.07 |
| Extruder Barrel Calculations | | | | | | | | | | | | |
| Steam Enthalpy | kJ/kg | 2770 | 2770 | 2770 | 2770 | 2770 | 2770 | 2770 | 2770 | 2770 | 2770 | 2770 |
| Steam Energy | kJ/hr | 221600 | 221600 | 221600 | 221600 | 221600 | 221600 | 221600 | 221600 | 221600 | 221600 | 221600 |
| Water Energy | kJ/hr | 3165 | 3015 | 3015 | 3015 | 2939 | 2939 | 2939 | 3090 | 2939 | 3015 | 2939 |
| Total Mass Flow in Extruder Barrel | kg/hr | 2444 | 2458 | 2432 | 2427 | 2434 | 2441 | 2440 | 2443 | 2544 | 2554 | 2537 |
| Specific Heat in Extruder Barrel | kJ/kg · °C. | 2.199 | 2.215 | 2.207 | 2.201 | 2.204 | 2.207 | 2.207 | 2.204 | 2.174 | 2.188 | 2.185 |
| Thermal Energy Added in Extruder Barrel | kJ/hr | 224765 | 224615 | 224615 | 224615 | 224539 | 224539 | 224539 | 224690 | 224539 | 224615 | 224539 |
| Thermal Energy in Extruder Barrel | kJ/hr | 637998 | 674152 | 662638 | 650715 | 638125 | 664358 | 664169 | 654158 | 642135 | 687180 | 678577 |
| Extruder Motor Power | kW | 111.9 | 111.9 | 111.9 | 111.9 | 111.9 | 111.9 | 111.9 | 111.9 | 111.9 | 111.9 | 111.9 |
| Total Mechanical Energy | kJ/hr | 245732 | 281988 | 382698 | 302130 | 269903 | 306158 | 390755 | 314215 | 241704 | 269903 | 350471 |
| Total Energy | kJ/hr | 883731 | 956140 | 1045336 | 952845 | 908028 | 970516 | 1054924 | 968373 | 883839 | 957082 | 102904 |
| Total Specific Energy (dry recipe basis) | kJ/kg | 440 | 477 | 525 | 478 | 455 | 486 | 528 | 484 | 440 | 478 | 517 |
| Calculated Moisture in Extruder Barrel | % wb | 26 | 26.6 | 26.3 | 26.1 | 26.2 | 26.3 | 26.3 | 26.2 | 25.1 | 25.6 | 25.5 |
| Specific Thermal Energy In Extruder Barrel (as is basis) | kJ/kg | 261 | 274 | 272 | 268 | 262 | 272 | 272 | 268 | 252 | 269 | 267 |
| Specific Mechanical Energy (as-is basis) | kJ/kg | 101 | 115 | 157 | 124 | 111 | 125 | 160 | 129 | 95 | 106 | 138 |
| Specific Mechanical Energy (as-is dry recipe basis) | kJ/kg | 122 | 141 | 192 | 152 | 135 | 153 | 196 | 157 | 120 | 135 | 176 |
| Specific Mechanical Energy (as-is dry recipe basis) | kW-hr/mton | 34 | 39 | 53 | 42 | 38 | 43 | 54 | 44 | 33 | 37 | 49 |
| Specific Thermal Energy (as-is dry recipe basis) | kJ/kg | 273 | 292 | 288 | 282 | 275 | 288 | 288 | 283 | 276 | 299 | 297 |
| Calculated Temperature Behind Die | °C. | 164 | 176 | 195 | 178 | 169 | 180 | 196 | 180 | 160 | 171 | 186 |

EXAMPLE 3

In this Example, a standard dog food formulation was prepared and preconditioned using a preconditioner in accordance with the invention. The formulation contained 53.0% corn, 22.0% poultry meal, 15% soy bean meal, and 10% corn gluten meal (all percentages by weight). This formulation was fed into the preconditioner inlet and subjected to treatment therein along with injection of steam and water. The small chamber shaft was rotated at a speed of 900 rpm in the reverse direction, whereas the large chamber shaft was rotated at 50 rpm in the forward direction. Three separate tests were conducted at different feed rates to the preconditioner, and the results of these tests are set forth in Table 3 below. The percent cook values obtained using the preconditioner ranged from 47.6-50.9%, and total SME values varied from 1.97-3.49 kW-Hr/Ton.

TABLE 3

| Name | Test 1 | Test 2 | Test 3 |
|---|---|---|---|
| Feed Rate (lbs/hr) | 5,000 | 9,000 | 10,000 |
| Cylinder Water (lbs/hr) | 850 | 1,600 | 1,700 |
| Cylinder Steam (lbs/hr) | 610 | 1,221 | 1,306 |
| Cylinder Oil (lbs/hr) | 0 | 0 | 0 |
| DDC Small (L) Shaft Direction (F or R)[1] | R | R | R |
| DDC Small (L) Shaft Speed (RPM) | 900 | 900 | 900 |
| DDC Small (L) Shaft Load (%) | 51.0% | 56.0% | 57.0% |
| DDC Small (L) HP | 15 | 15 | 15 |
| DDC Large ® Shaft Direction (F or R) | F | F | F |
| DDC Large ® Shaft Speed (RPM) | 50 | 50 | 50 |
| DDC Large ® Shaft Load (%) | 27.0% | 33.0% | 31.0% |
| DDC Large ® HP | 15 | 15 | 15 |
| Cylinder Weight (lbs) | 293 | 345 | 350 |
| Cylinder Retention Time (Minutes) | 2.72 | 1.75 | 1.61 |
| Cylinder Downspout Temp (Deg F.) | 200 | 199 | 200 |

[1]F refers to the forward direction and R refers to the rearward direction. Directionality is achieved by orientation of the shaft mixing paddles and/or use of oppositely rotating shafts. In the present Examples, the shafts were rotated in the same direction, and in the F direction the paddles are oriented to move the mixture forwardly, whereas in the R direction the paddles are oriented to retard the forward movement of the mixture.

EXAMPLE 4

In this Example, a standard cat food formulation was prepared and preconditioned as set forth in Example 4. The cat food formulation contained 32% poultry meal, 28% corn, 14% rice, 13% corn gluten meal, 3% beat pulp, 2% phosphoric acid (54% $H_3PO_4$), and 8% poultry fat (all percentages by weight). In the three separate test runs, the small chamber shaft was rotated at 800 rpm in the reverse direction while the large chamber shaft rotated at 50 rpm in the forward direction. The results of these tests are set forth in Table 4 below, where percent cook varied from 45.8 to 48.1% and total SME values ranged from 2.9 to 3.9 kW-Hr/Ton.

TABLE 4

| Name | Test 4 | Test 5 | Test 6 |
|---|---|---|---|
| Feed Rate (lbs/hr) | 4,000 | 4,000 | 4,000 |
| Cylinder Water (lbs/hr) | 760 | 760 | 1,140 |
| Cylinder Steam (lbs/hr) | 580 | 580 | 840 |
| Cylinder Oil (lbs/hr) | 200 | 280 | 0 |
| DDC Small (L) Shaft Direction (F or R) | R | R | R |
| DDC Small (L) Shaft Speed (RPM) | 800 | 800 | 800 |
| DDC Small (L) Shaft Load (%) | 40.0% | 40.0% | 42.0% |
| DDC Small (L) HP | 15 | 15 | 15 |
| DDC Large ® Shaft Direction (F or R) | F | F | F |
| DDC Large ® Shaft Speed (RPM) | 50 | 50 | 50 |
| DDC Large ® Shaft Load (%) | 28.0% | 29.0% | 35.0% |
| DDC Large ® HP | 15 | 15 | 15 |
| Cylinder Weight (lbs) | 286 | 288 | 310 |
| Cylinder Retention Time (Minutes) | 3.21 | 3.24 | 2.33 |
| Cylinder Downspout Temp (Deg F.) | 200 | 200 | 201 |
| DDC Small (L) SME (kW-Hr/Ton) | 2.10 | 2.10 | 1.60 |
| DDC Large ® SME (kW-Hr/Ton) | 1.70 | 1.80 | 1.30 |
| Total DDC Calc'd SME (kW-Hr/Ton) | 3.80 | 3.90 | 2.90 |
| Total Starch | 34.61 | 32.77 | 33.83 |
| Gelatinized Starch | 15.84 | 15.78 | 16.09 |
| % Cook | 45.8 | 48.1 | 47.6 |

EXAMPLE 5

In this Example, a floating aquatic feed formulation used in the manufacture of catfish feeds was prepared and preconditioned as set forth in Example 3. The floating aquatic feed formulation contained 20% whole corn, 20% fish meal, 20% de-fatted rice bran, 15% wheat middlings, 10% soybean meal, 10% beat pulp, and 5% wheat (all percentages by weight). The three separate test runs, the small diameter shaft was rotated at 800 rpm in the reverse direction and the large diameter shaft was rotated at 50 rpm in the forward direction. These results are set forth in Table 5 below where it can be seen that the cook varied from 78.7-84.5% and the total SME values were 3.7 kW-Hr/Ton.

TABLE 5

| Name | Test 7 | Test 8 | Test 9 |
|---|---|---|---|
| Feed Rate (lbs/hr) | 4,000 | 4,000 | 4,000 |
| Cylinder Water (lbs/hr) | 1,280 | 1.360 | 1.520 |
| Cylinder Steam (lbs/hr) | 1,200 | 1,200 | 1.200 |
| Cylinder Oil (lbs/hr) | 0 | 0 | 0 |
| DDC Small (L) Shaft Direction (F or R) | R | R | R |
| DDC Small (L) Shaft Speed (RPM) | 800 | 800 | 800 |
| DDC Small (L) Shaft Load (%) | 37.0% | 37.0% | 37.0% |
| DDC Small (L) HP | 15 | 15 | 15 |
| DDC Large ® Shaft Direction (F or R) | F | F | F |
| DDC Large ® Shaft Speed (RPM) | 50 | 50 | 50 |
| DDC Large ® Shaft Load (%) | 29.0% | 29.0% | 29.0% |
| DDC Large ® HP | 15 | 15 | 15 |
| Cylinder Weight (lbs) | 284 | 285 | 286 |
| Cylinder Retention Time (Minutes) | 2.63 | 2.61 | 2.55 |
| Cylinder Downspout Temp (Deg F.) | 204 | 204 | 204 |
| DDC Small (L) SME (kW-Hr/Ton) | 2.10 | 2.10 | 1.60 |
| DDC Large ® SME (kW-Hr/Ton) | 1.60 | 1.60 | 1.60 |
| Total DDC Calc'd SME (kW-Hr/Ton) | 3.70 | 3.70 | 3.70 |
| Moisture (MCWB %) | 36.22 | 35.89 | 35.28 |
| Total Starch | 27.49 | 26.87 | 28.87 |
| Gelatinized Starch | 21.63 | 22.05 | 21.86 |
| % Cook | 78.70 | 82.10 | 84.50 |

EXAMPLE 6

In this Example, a sinking aquatic feed formulation used in the manufacture of Sea Bass/Sea Breem feeds was prepared and preconditioned as set forth in Example 3. The sinking aquatic feed formulation was made up of 53.5% soybean meal, 15% wheat, 8.5% corn gluten feed, 6.0% corn, 1% sunflower meal, and 16% fish oil. In three separate tests, the small chamber shaft was rotated at 800 rpm in the reverse direction and the large diameter shaft was rotated at 50 rpm in the forward direction. These results are set forth in Table 6, where it will be seen that percent cook ranges from 72.5-75.8% and total SME values were from 2.2-3.2 kW-Hr/Ton.

TABLE 6

| Name | Test 10 | Test 11 | Test 12 |
|---|---|---|---|
| Feed Rate (lbs/hr) | 5,000 | 7,000 | 9,000 |
| Cylinder Water (lbs/hr) | 940 | 1,330 | 1,710 |
| Cylinder Steam (lbs/hr) | 716 | 940 | 1,330 |
| Cylinder Oil (lbs/hr) | 350 | 490 | 270 |
| DDC Small (L) Shaft Direction (F or R) | R | R | R |
| DDC Small (L) Shaft Speed (RPM) | 800 | 800 | 800 |
| DDC Small (L) Shaft Load (%) | 45.0% | 49.0% | 54.0% |
| DDC Small (L) HP | 15 | 15 | 15 |
| DDC Large (R) Shaft Direction (F or R) | F | F | F |
| DDC Large (R) Shaft Speed (RPM) | 50 | 50 | 50 |
| DDC Large (R) Shaft Load (%) | 31.0% | 36.0% | 39.0% |
| DDC Large (R) HP | 15 | 15 | 15 |
| Cylinder Weight (lbs) | 306 | 334 | 357 |
| Cylinder Retention Time (Minutes) | 2.62 | 2.05 | 1.74 |
| Cylinder Downspout Temp (Deg F.) | 201 | 199 | 199 |
| DDC Small (L) SME (kW-Hr/Ton) | 1.90 | 1.60 | 1.30 |
| DDC Large (R) SME (kW-Hr/Ton) | 1.30 | 1.10 | 0.90 |
| Total DDC Calc'd SME (kW-Hr/Ton) | 3.20 | 2.70 | 2.20 |
| Total Starch | 11.74 | 12.05 | 12.52 |
| Gelatinized Starch | 8.63 | 9.14 | 9.08 |
| % Cook | 73.50 | 75.80 | 72.50 |

I claim:

1. A single screw extruder operable to process a human food or animal feed material, said extruder comprising:
   an elongated barrel having an inlet and a spaced, restricted orifice die outlet; and
   a single, elongated, axially rotatable, flighted screw assembly (52) presenting a longitudinal axis and situated within said barrel and operable to move material from said inlet through said barrel and out said die outlet,
      said screw assembly (52) including at least one elongated screw section (76) having a central body (82) defining a root diameter, and helical flighting (86) extending outwardly from said central body and presenting an outer periphery with spacings between adjacent portions (86a, 86b) of said flighting (86), said spacings each defined by a surface (88) extending from a first outer periphery (90a) of one of said flighting portions (86a) to a second outer periphery (90b) of the adjacent flighting portion (86b), said spacing-defining surface (88) including first and second surface segments (88a, 88b) respectively extending inwardly from said first and second peripheries (90a, 90b) and toward said central body (82), and a third surface segment (88c) interconnecting said first and second surface segments (88a, 88b), said second surface segments (88b) and the proximal second flighting peripheries (90b) defining respective angles of from about 75-90° relative to said longitudinal axis, the joinder of said first and second surface segments (88a, 88b) with said third surface segment (88c) being substantially smooth and arcuate without any substantial angular discontinuities,
      the section of said barrel in surrounding relationship to said at least one screw section having inwardly extending rib elements,
   said extruder configured to at least partially cook said human food or animal feed material during passage thereof through said barrel.

2. The single screw extruder of claim 1, said respective angles being equal.

3. The single screw extruder of claim 1, there being flighting depths between the second peripheries (90b) of said second flighting portions (86b) and said central body (82), said respective angles defined by 20% of the associated flighting depths, measured from the peripheries (90b) of said second flighting portions (86b).

4. The single screw extruder of claim 3, said respective angles each being about 90°.

5. The single screw extruder of claim 1, there being a pair of said screw sections (76, 74) forming at least a part of said screw assembly (52), one of said screw sections (76) having a greater pitch than the other of said screw sections (74).

6. The single screw extruder of claim 5, said one screw section (76) being closer to said die outlet than said other screw section (74).

7. The single screw extruder of claim 6, including a steamlock component between said one and other screw sections (76, 74).

8. The single screw extruder of claim 1, including an adjustable, flow-restricting valve closer to said die outlet than said screw section (74).

9. The single screw extruder of claim 1, said screw assembly further including a compressing screw section having a progressively decreasing flighting depth along the length thereof.

10. The single screw extruder of claim 9, said compressing screw section located closer to die outlet than said screw section (74).

11. The single screw extruder of claim 1, said screw assembly further including a disrupting screw section including a plurality of flighted screw parts, with adjacent ones of said screw parts having an opposite pitch.

12. The extruder of claim 1, said rib elements being helically oriented.

13. The combination of a preconditioner and a single screw extruder operable to process a human food or animal feed material, comprising:
   an elongated barrel having an inlet and a spaced, restricted orifice die outlet;
   a single, elongated, axially rotatable, flighted screw assembly presenting a longitudinal axis and situated within said barrel and operable to move material from said inlet through said barrel and out said die outlet,
      said screw assembly (52) including at least one elongated screw section (76) having a central body (82) defining a root diameter, and helical flighting (86) extending outwardly from said central body and presenting an outer periphery with spacings between adjacent portions (86a, 86b) of said flighting (86), said spacings each defined by a surface (88) extending from a first outer periphery (90a) of one of said flighting portions (86a) to a second outer periphery (90b) of the adjacent flighting portion (86b), said spacing-defining surface (88) including first and second surface segments (88a, 88b) respectively extending inwardly from said first and second peripheries (90a, 90b) and toward said central body (82), and a third surface segment (88c) interconnecting said first and second surface segments (88a, 88b), said second surface segments (88*b*) and the proximal second flighting peripheries (90*b*) defining respective angles of from about 75-90° relative to said longitudinal axis, the joinder of said first and second surface segments (88*a*, 88*b*) with said third surface segment (88*c*) being substantially smooth and arcuate without any substantial angular discontinuities, the section of said barrel in surrounding relationship to said at least one screw section (76) having inwardly extending rib elements, said extruder configured to at least partially cook said human food or animal feed material during passage thereof through said barrel; and a preconditioner operably coupled with said barrel inlet in order to precondition material prior to passage thereof into said extruder, said preconditioner comprising— an elongated mixing vessel having an inlet and an outlet, said vessel outlet operably connected with said barrel inlet;

a pair of elongated mixing shafts each having a plurality of mixing elements, said shafts located in laterally spaced apart relationship within said vessel;

a pair of variable drive mechanisms operably coupled with said shafts in order to permit selective rotation of the shafts at individual rotational speeds independent of each other; and a control device operably coupled with said drive mechanisms to independently control the rotational speed of said shafts.

14. The combination of claim 13, said drive mechanisms each comprising a variable frequency drive.

15. The combination of claim 13, said vessel having elongated, transversely arcuate walls presenting a pair of elongated, juxtaposed, intercommunicated chambers, one of said chambers having a greater cross-sectional area than the other of said chambers.

16. The combination of claim 13, said shafts operable to rotate in opposite directions, respectively.

17. The combination of claim 13, said respective angles being equal.

18. The combination of claim 13, there being flighting depths between the second peripheries (90*b*) of said second flighting portions (86*b*) and said central body (82), said respective angles defined by 20% of the associated flighting depths, measured from the peripheries (90*b*) of said second flighting portions (86*b*).

19. The combination of claim 18, said respective angles each being about 90°.

20. The combination of claim 13, there being a pair of said screw sections (76, 74) forming at least a part of said screw assembly (52), one of said screw sections (76) having a greater pitch than the other of said screw sections (74).

21. The combination of claim 20, said one screw section (76) being closer to said die outlet than said other screw section (74).

22. The combination of claim 21, including a steamlock component between said one and other screw sections (76, 74).

23. The combination of claim 13, including an adjustable, flow-restricting valve closer to said die outlet than said screw section (74).

24. The combination of claim 13, said screw assembly further including a compressing screw section having a progressively decreasing flighting depth along the length thereof.

25. The combination of claim 24, said compressing screw section located closer to die outlet than said screw section (74).

26. The combination of claim 13, said screw assembly further including a disrupting screw section including a plurality of flighted screw parts, with adjacent ones of said screw parts having an opposite pitch.

27. The combination of claim 13, said rib elements being helically oriented.

* * * * *